Figure 1:
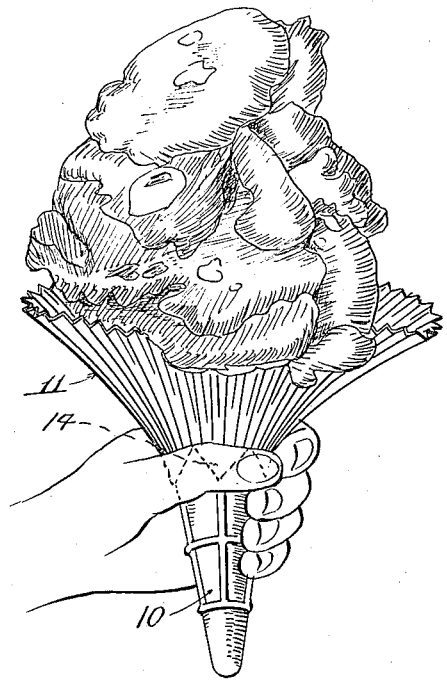

Feb. 8, 1927.  D. BOYNTON  1,616,570
ICE CREAM CONE
Filed June 9, 1926

Inventor:
Dorothy Boynton,
by Charles O. Hervey
his Atty

Patented Feb. 8, 1927.

1,616,570

UNITED STATES PATENT OFFICE.

DOROTHY BOYNTON, OF CHICAGO, ILLINOIS.

ICE-CREAM CONE.

Application filed June 9, 1926. Serial No. 114,686.

This invention relates to ice cream cones and its principal object is to provide an edible container with a collapsible flaring extension for containing a quantity of ice cream, ices or other edible frozen commodities greatly in excess of that usually sold in the ordinary ice cream cones, which extension may be snugly wrapped about or collapsed against the side of the edible cone portion to prevent the melted ice cream from escaping between the edible cone portion and the extension. Another object is to provide a flaring extension for edible ice cream cones that may be readily slipped upon an edible cone to increase its capacity, and having flaps or wings arranged to extend along the sides of the edible cone portion to form a sleeve therefor that may be grasped by the hand holding the cone, to thereby securely hold the extension on the edible cone portion and in close contact therewith.

The invention consists in the several novel features hereinafter fully set forth and claimed.

Figure 2:
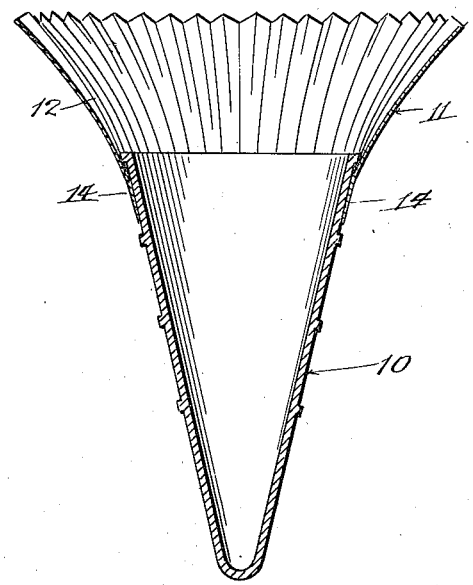
Figure 3:
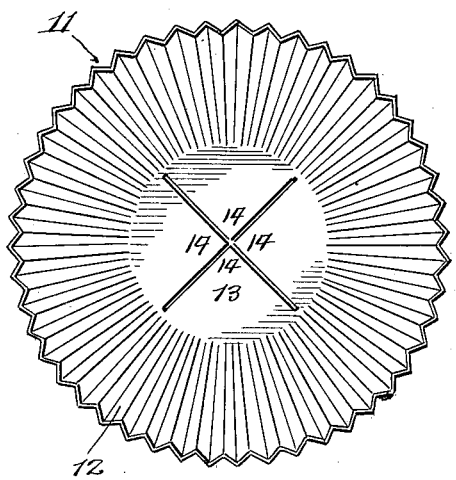
Figure 4:
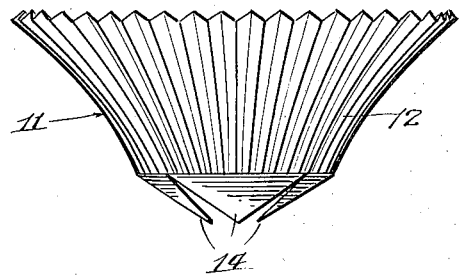

The invention is clearly illustrated in the drawing accompanying this specification, in which:

Fig. 1 is a perspective view of an ice cream cone embodying a simple form of the present invention and showing the same held in a person's hand; Fig. 2 is a central longitudinal section through the cone; Fig. 3 is a plan of the cone extension and Fig. 4 is a side elevation thereof.

Referring to said drawing, which illustrates one embodiment of the invention, the reference character 10 designates an edible, hollow, cone shaped container of ordinary form and construction, made of pastry material as usual, and comprising the edible cone portion of a device. Removably held on the larger end of said cone portion is a cone extension 11, preferably made of paper or similar material and having a frusto-conical form, the flaring side wall 12 of which is preferably fluted and extends from a bottom portion 13, which contains an opening, preferably formed by slitting the bottom wall in radial directions at a number of places. Flaps or wings 14 are left between the slits, which are bent down and around the edible cone portion. Conveniently the cone extension 11 may be made from a round piece of paper formed up by suitable dies or rolls to present the fluted flaring side wall 12 and the slit bottom portion 13.

A number of edible cone portions and paper cone extensions may be packed and stored in separate receptacles, and in assembling a cone, embodying the present invention, the apex end of an edible cone member 10 is thrust down through the slit bottom portion 13 of the paper cone extension 11, and pushed down until the flaps or wing 14 hug the sides of the edible cone member, thereby practically closing the space between the outer side of the edible cone member and the sides of the opening in the bottom of the cone extension.

The flaring side wall of the cone extension greatly increases the mouth of the ice cream cone and an increased amount of ice cream, ices or other frozen edible commodity, or several kinds of ice creams, may be placed in the hollow of the cone extension. The person holding the device places his thumb and fingers around the flaps or wings 14 and holds them tightly around the sides of the cone member 10 thereby preventing any of the melted ice cream from leaking out between the cone member 10 and sides of the opening in the bottom of the cone extension. When most of the ice cream, contained in the cone extension, has been consumed, the hand may be moved upward a little and the lower portion of the flaring paper cone extension may be collapsed or squeezed against the outer sides of the cone member 10 to force into same any ice cream that may have collected between the outer face of the edible cone member and the inner face of the lower portions of the cone extension. When the contents of the cone extension have been emptied, the cone extension may be removed, since the remaining frozen commodity is now contained in the edible cone portion and the remaining contents and edible cone portion may be eaten in the customary manner.

It will be observed from above that an increased amount of the frozen confection, ice cream and so forth, may be served in a container embodying the present invention and that the ordinary and well known ice cream cone may be employed in conjunction with a cone extension to provide a complete, composite article, partly edible and partly not so. Furthermore that the cone extension may be collapsed or squeezed tightly against the sides of the edible cone member to prevent leakage of the frozen commodity and to direct part of the contents of the cone extension into the edible cone member for consumption with edible cone member.

I claim as new, and desire to secure by Letters Patent:

1. An ice cream cone comprising an edible cone shaped container and a collapsible widely flaring paper cone extension thereon and forming a widely flaring open end therefor, having a centrally disposed opening of sufficient size to admit and receive the larger end portion of the edible cone shaped container, said edible cone shaped container projecting through said hole and forming a bottom for the cone extension, the container and cone extension serving to contain a frozen edible commodity and the cone extension being capable of having its lower end portion held snugly about the cone shaped container to prevent the escape of the contents between the cone shaped container and cone extension.

2. An ice cream cone comprising an edible cone shaped container and a collapsible widely flaring paper cone extension thereon having a bottom portion slit to form downwardly projecting flaps extending along the outer sides of the cone shaped container, said slit bottom portion being adapted to receive the larger end part of the cone shaped container and said cone shaped container projecting through said slit bottom of the cone extension and forming a bottom therefor, the cone shaped container and cone extension serving to contain a frozen edible commodity and the cone extension being capable of having its flaps and lower end portion held snugly about the cone shaped container to prevent the escape of contents between the cone shaped container and cone extension.

DOROTHY BOYNTON.